United States Patent
Aoyama et al.

(10) Patent No.: US 7,428,686 B2
(45) Date of Patent: Sep. 23, 2008

(54) ERROR DETECTION/CORRECTION SYSTEM, AND CONTROLLER USING THIS SYSTEM

(75) Inventors: Kazunari Aoyama, Yamanashi (JP); Minoru Nakamura, Yamanashi (JP); Yutaka Sakai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 238 days.

(21) Appl. No.: 10/726,561

(22) Filed: Dec. 4, 2003

(65) Prior Publication Data

US 2004/0153939 A1  Aug. 5, 2004

(30) Foreign Application Priority Data

Dec. 6, 2002 (JP) .............................. 2002-355634

(51) Int. Cl.
*H03M 13/00* (2006.01)
(52) U.S. Cl. ..................................... 714/752; 714/746
(58) Field of Classification Search .................. 714/752, 714/746, 762, 763, 764, 770, 787, 804, 14, 714/30, 769
See application file for complete search history.

(56) References Cited

U.S. PATENT DOCUMENTS

| | | | | |
|---|---|---|---|---|
| 4,356,550 A * | 10/1982 | Katzman et al. | ............... | 714/14 |
| 4,453,213 A * | 6/1984 | Romagosa | .................... | 714/30 |
| 5,260,951 A | 11/1993 | Watanabe | | |
| 5,535,405 A * | 7/1996 | Byers et al. | .................. | 710/110 |
| 5,539,754 A * | 7/1996 | Zuras et al. | .................. | 714/785 |
| 5,570,425 A * | 10/1996 | Goodman et al. | ........ | 381/71.11 |
| 5,638,384 A | 6/1997 | Hayashi et al. | | |
| 5,701,413 A * | 12/1997 | Zulian et al. | ................. | 709/214 |
| 6,282,688 B1 * | 8/2001 | Tsunoda et al. | ............. | 714/769 |
| 6,745,268 B1 * | 6/2004 | Greeff et al. | ................. | 710/100 |
| 2002/0138794 A1 * | 9/2002 | Kikuchi et al. | .............. | 714/707 |

FOREIGN PATENT DOCUMENTS

| | | |
|---|---|---|
| EP | 0647035 | 4/1995 |
| JP | 5-158808 | 6/1993 |
| JP | 8-053942 | 2/1994 |
| JP | 11-065944 | 3/1999 |
| WO | 98/01806 | 1/1998 |
| WO | WO 98/01806 | 1/1998 |

OTHER PUBLICATIONS

Notice of Reasons for Rejection.

* cited by examiner

*Primary Examiner*—Guy Lamarre
*Assistant Examiner*—Fritz Alphonse
(74) *Attorney, Agent, or Firm*—Staas & Halsey LLP

(57) ABSTRACT

A controller has a plurality of modules connected to each other via buses. On the transmitter side of each module, detection/correction code generation circuit for address/command and detection/correction code generation circuits for each kind of data are switched over according to information to be transmitted by a transmitter selection circuit, and then the data is transmitted with ECC code attached. On the receiver side, a receiver selection circuit selectively switches over an error detection/correction circuit for address/command and error detection/correction circuits for each kind of data to detect and correct errors.

9 Claims, 2 Drawing Sheets

ERROR DETECTION/CORRECTION SYSTEM, AND CONTROLLER USING THIS SYSTEM

BACKGROUND OF THE INVENTION

1. Field of the Invention

The present invention relates to an error detection/correction system and a controller using this system in a bus that connects modules of the control system with each other.

2. Description of the Related Art

In transmitting data, the data may include an error during the transmission. In order to detect and correct this data error, error detection/correction codes are used. In general, if an error detection/correction code has more inspection bits, then the detection/correction capacity becomes higher. If the unit for error detection/correction becomes larger, then the detection/correction capacity becomes higher when the ratio of the number of inspection bits to the number of information bits is the same.

On the other hand, the address and command portions of the bus transfer unit have a fixed length, while the data portion has a variable length. From this constraint, the size of a packet for error detection/correction is determined based on the minimum transfer quantity on a data side. In general, detection/correction capacity depends on ratio of inspection bits to information bits.

There is known a data error detection device (refer to Japanese Patent Application Laid-open No. 11-65944) in which, for coping with a variation in data quantity to be transmitted and received, a plurality of (k) ECC (error correction code) circuits (of n bits), which has been used when the number of output bits of the memory element is small, are used to detect an occurrence of trouble in the memory element, when the number of output bits of a memory element increases (to n×k bits).

In multiple starting points/multiple targets terminal unit switching system that exchanges messages via a fixed size burst or a cell, there is known a system in which each terminal unit generates an initial error correction code in a first burst of a message, a preceding burst error correction code, and an error correction code as a function of a burst data byte, and detects an error by comparing these generated error correction codes with a reception burst error correction code, thereby to secure the preservation of message exchanged between data processing terminals (refer to Japanese Patent Application Laid-open No. 6-53942).

In a method wherein data is divided into minimum units and an error is detected for each of the minimum data units in case where error detection is carried out for data of which length changes, the detection/correction capacity becomes constant. When the unit for error detection/correction becomes large, it is not possible to obtain the above-explained merit that, if the ratio of the number of inspection bits to the number of information bits is the same, the detection/correction capacity becomes higher when the unit for error detection/correction becomes larger.

SUMMARY OF THE INVENTION

In an error detection/correction system in data transmission between a plurality of modules that are connected via buses in a controller, according to the present invention, a plurality of error detection/correction code generation circuits having a difference in at least one of an inspection bit length, an information bit length, and a correction capacity, and error detection/correction circuits corresponding to the error detection/correction code generation circuits are built into the system, and an error detection/correction code generation circuit and an error detection/correction circuit to be used are switched over dependent upon a kind, a length, and a timing of the data to be transferred.

The error detection/correction system according to the present invention may adopt the following embodiments.

The error detection/correction system may switch over error detection/correction codes to be used dependent upon a phase of transmitting an address, a command, and data.

The error detection/correction system may switch over error detection/correction codes to be used, dependent upon whether in a single access mode or in a burst access mode.

The error detection/correction system may switch over error detection/correction codes to be used, dependent upon a data quantity to be transferred.

The controller according to the present invention may have a plurality of modules, connected via buses, adopting the above error detection/correction system.

The controller may comprise a serial transfer module that connects a plurality buses connecting the plurality of modules, by means of a serial transmission line, wherein a plurality of error detection/correction code generation circuits having a difference in at least one of an inspection bit length, an information bit length, and a correction capacity, and error detection/correction circuits corresponding to the error detection/correction code generation circuits are also built into the serial transfer module, and the error detection/correction system is used also in the serial transfer.

According to the present invention, there are provided an error detection/correction system and a controller that employs this system, both capable of improving the correction/detection capacity to obtain an optimum capacity even when the size of a unit for error detection/correction changes and for any kind of information.

BRIEF DESCRIPTION OF THE DRAWINGS

The above and other objects and features of the present invention will become apparent from the following explanation with reference to the accompanying drawings, in which.

DESCRIPTION OF THE EMBODIMENTS

Figure 1:
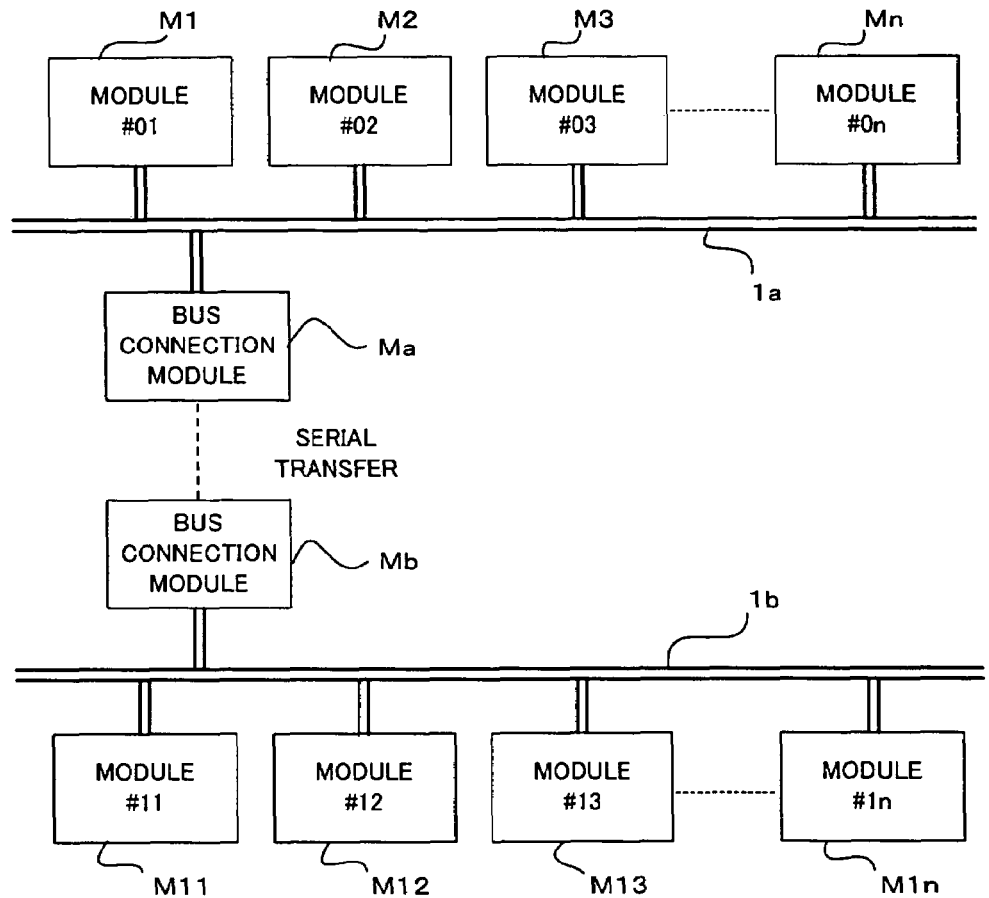
FIG. 1 is a block diagram of a main portion of a controller employing the error detection/correction system according to one embodiment of the present invention.

FIG. 1 is a block diagram of a main portion of a controller employing the error detection/correction system according to one embodiment of the present invention. A plurality of modules M1 to Mn are connected to a bus $1a$. A plurality of modules M11 to M1$n$ are also connected to a bus $1b$. The bus $1a$ and the bus $1b$ are connected to each other in series via bus connection modules Ma and Mb. Each module can become a bus master or a bus slave. When a bus master obtains a right of using a bus, the bus master outputs an address of an access destination and a command, so that a bus cycle is generated. A state where these pieces of information are output is called address phase. A module other than the bus master receives the information of the address phase, and when the module finds that the access is made to the self, this module becomes a slave, with the result that data exchange between the bus master and the bus slave is carried out. A state where the data exchange is carried out is called data phase.

FIGS. 2A to 2C illustrate transfer formats on buses. In an address phase, an address and a command are transmitted sequentially, and an error correction code (hereinafter referred to as ECC code) is added last to the whole of the address and command. Though an ECC code may be added to each of the address and the command, the format of address phase is fixed in any case.

However, in the data phase, there are single access in which a data quantity is fixed as shown in FIG. 2A and FIG. 2B, and a burst access in which a data quantity is variable as shown in FIG. 2C. There are two kinds of single access that are discriminated based on a difference of a data quantity. For example, in one kind of single access, the ECC code is added to 32 bits of a data quantity as shown in FIG. 2A. In the other kind of single access, the ECC code is added to 64 bits of a data quantity as shown in FIG. 2B. In the burst access, as a data quantity is variable, and data and the ECC code are not isolated, as shown in FIG. 2C.

The information indicating a difference of a format of data phase is contained in the command of address phase. A slave decides the format of data phase based on this information.

Figure 3:
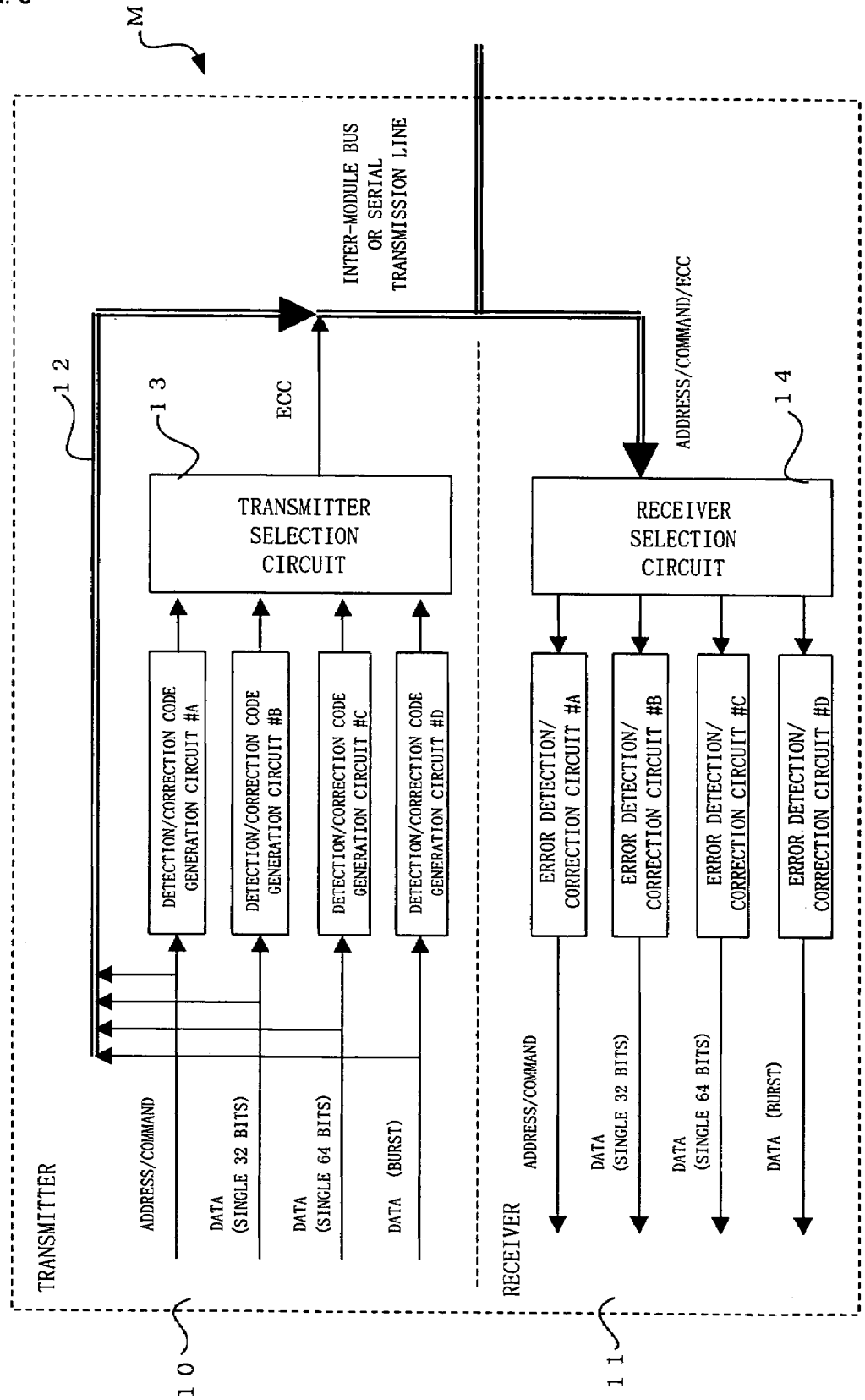
FIG. 3 is a block diagram of a main portion of a module according to the embodiment.

FIG. 3 illustrates a configuration inside the module. In the present embodiment, the modules M1 to Mn and M11 to M1$n$ can become both bus masters and slaves. The bus connection modules Ma and Mb also have the same configuration as the configuration of these modules. FIG. 3 illustrates the configuration of one module (M is assigned to represent the modules M1 to Mn and M11 to M1$n$, and the bus connection modules Ma and Mb).

Each module M has a transmitter 10 and a receiver 11. The transmitter 10 and the receiver 11 are connected to an inter-module bus (1$a$, 1$b$) or a serial transmission line via an internal bus 12.

The transmitter 10 comprises: a detection/correction code generation circuit #A that receives an address/command to generate an error detection/correction code (ECC code); a detection/correction code generation circuit #B that receives data of single 32 bits to generate an error detection/correction code (ECC code); a detection/correction code generation circuit #C that receives data of single 64 bits of a double data width to generate an error detection/correction code (ECC code); a detection/correction code generation circuit #D that receives burst data to generates an error detection/correction code (ECC code); and a transmitter selection circuit 13.

The address, command, and data (single data, double single data, and burst data) are transmitted to the internal bus 12 respectively. The transmitter selection circuit 13 adds the ECC code as shown in FIG. 2A to FIG. 2C to the data according to address/command and a kind of data transmitted. The address/command and data to which an ECC code is added is transmitted to either the inter-module buses 1$a$, 1$b$ or the serial transmission line.

On the other hand, the receiver 11 comprises: a receiver selection circuit 14; an error detection/correction circuit #A that detects and corrects an error of address/command; an error detection/correction circuit #B that detects and corrects an error of data of single 32 bits; an error detection/correction circuit #C that detects and corrects an error of data of single 64 bits of a double data width; and an error detection/correction circuit #D that detects and corrects an error of burst data. The receiver selection circuit 14 delivers the data to the error detection/correction circuits #A to #D according to address/command and a kind of data received via either the inter-module buses 1$a$, 1$b$ or the serial transmission line. The error detection/correction circuits #A to #D detect and correct errors, and the address/command and data for which error detection/correction is completed is delivered in the module M.

Figure 2:
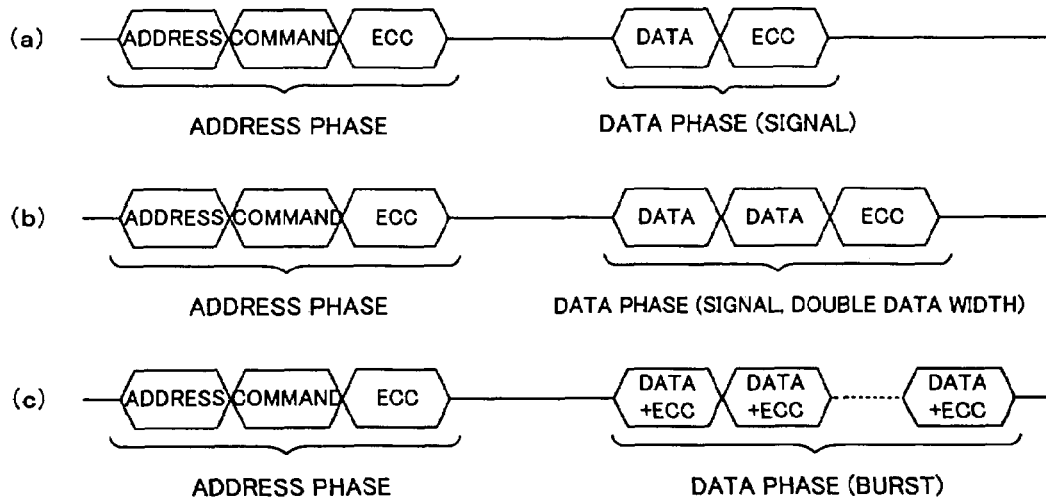
FIGS. 2A to 2C are explanatory diagrams of transfer formats on buses according to the embodiment.

In the address phase where the bus master transmits an address/command, the transmitter selection circuit 13 selects the ECC code generated by the detection/correction code generation circuit #A for the address/command phase. The ECC code is added to the last of the address/command as shown in FIG. 2, and the address/command to which the ECC code is added is transmitted to either the inter-module buses 1$a$, 1$b$ or the serial transmission line. On the other hand, for the modules other than the bus master, the receiver selection circuit 14 selects the error detection/correction circuit #A for the address phase when receiving the address phase.

In the data phase, the slave transmits data to read the data, and the bus master transmits data to write the data. The transmitter module switches over between the detection/correction code generation circuits #A to #D on the side of the transmitter 10 for each transfer format as shown in FIG. 2A to FIG. 2C, and transmits the switched result to the bus. In the receiver module, the receiver selection circuit 14 selectively switches over between error detection/correction circuits #A to #D on the side of the receiver correspondingly.

When the bus master outputs address/command to write data, the receiver slave module recognizes the transfer format based on the information of the command received in the address phase. Based on the transfer format instructed by this command, the receiver selection circuit 14 of the receiver module (slave) receives the data by switching over the circuit to the error detection/correction circuit #B in case where the data is single 32 bits, by switching over the circuit to the error detection/correction circuit #C in case where the data is single 64 bits, or by switching over the circuit to the error detection/correction circuit #D in case where the data is burst data.

On the other hand, when the bus master outputs address/command to read data, the receiver slave module recognizes the transfer format based on the information of the command received in the address phase. Based on this transfer format, the transmitter selection circuit 13 switches over between the detection/correction code generation circuits #B to #D to transmit the read data to which the ECC code generated in the detection/correction code generation circuits #B to #D is added, as shown in FIG. 2.

The module of the bus master that receives this data has already assigned the transfer format when transmitting the address/command in the address phase. Therefore, the receiver selection circuit 14 of the module of this bus master selectively switches over between the error detection/correction circuits #B to #D corresponding to the assigned transfer format, and detects and corrects the error of the received data, and takes in the data.

Preparing a few kinds of transfer formats in a similar manner in the inter-bus serial transmission line, the error detection/correction code generation circuits or the error detection/correction circuits are switched over so that an optimum circuit carries out error detection and correction.

As described above, according to the present embodiment, in the communication between modules that are connected to each other via buses in the controller, each module has detection/correction code generation circuits and error detection/correction circuits corresponding to a few kinds of transfer formats. With this arrangement, optimum data transmission can be achieved.

In the above embodiment, a module comprises an error detection/correction code generation circuit #A and an error detection/correction circuit #A for address/command, an error detection/correction code generation circuit #B and an error detection/correction circuit #B for single 32 bit data, an error detection/correction code generation circuit #C and an error detection/correction circuit #C for single 64 bit data, and an error detection/correction code generation circuit #D and an error detection/correction circuit #D for burst data. In addition to this configuration, it is also possible to employ a necessary optimum error detection/correction system, by providing error detection/correction code generation circuits and error detection/correction circuits having a difference in inspection bit length, information bit length, and correction capacity.

Particularly, by changing the error detection/correction system for address and command portions and data portion, error detection/correction is carried out in a large packet unit for the address and command portions having a fixed length. With this arrangement, the detection and correction capacity for the address and command portions can be increased, as compared with the capacity for the data portion.

When an error occurs in address and command portions, data of an unexpected portion may be disturbed, or the system may access a resource where access is prohibited, which may cause serious obstacles. Therefore, by increasing the capacity of detecting and correcting error of such portion, high reliability can be obtained.

Further, including a cycle having a high error detection and correction capacity in a part of bus cycle, if inconvenience is detected in hardware, a cause and a trouble portion of the inconvenience can easily be identified. For example, when adjacent two bit error detection is applied to address/command portion, and one bit error detection is applied to data transfer portion, although the system cannot continue operating when adjacent two bits of bus are short-circuited, it is possible to identify which of two bits of the bus are in trouble, so that it is effective in analyzing a trouble portion and a cause.

According to the present invention, from among a plurality of different error detection and correction functions, an optimum function is used for data transmitting according to the contents, quantity and characteristics of information to be transmitted. Therefore, it is possible to achieve highly reliable data transmission.

The invention claimed is:

1. An error detection/correction system in data transmission between a plurality of modules that are connected via buses in a controller, the system comprising:
   in each of the modules,
   a plurality of error detection/correction code generation circuits having a difference in at least one of an inspection bit length, an information bit length, and a correction capacity generating an error correction code to be added to data to be transmitted to the bus connected to the module or to a serial transmission line; and
   a plurality of error detection/correction circuits corresponding to a respective one of the error detection/correction code generation circuits, wherein an error detection/correction code generation circuit and an error detection/correction circuit are switched over dependent upon a kind, a length, and a timing of the data to be transferred to detect and correct an error of the data having the error correction code added;
   wherein the error detection/correction system switches over error detection/correction codes to be used dependent upon on a phase of transmitting an address, a command, and data.

2. The error detection/correction system according to claim 1, wherein the error detection/correction system switches over error detection/correction codes to be used dependent upon whether at a time of single access or at a time of burst access.

3. A controller in which a plurality of modules that adopt the error detection/correction system according to claim 2 are connected via buses.

4. The error detection/correction system according to claim 1, wherein the error detection/correction system switches over between error detection/correction codes to be used, dependent upon a data quantity to be transferred.

5. A controller in which a plurality of modules that adopt the error detection/correction system according to claim 4 are connected via buses.

6. A controller in which a plurality of modules that adopt the error detection/correction system according to claim 1 are connected via buses.

7. The controller according to claim 6, wherein
   the controller comprises a serial transfer module that connects a plurality buses connected with the plurality of modules, by means of a serial transmission line, and
   a plurality of error detection/correction code generation circuits having a difference in at least one of an inspection bit length, an information bit length, and a correction capacity, and error detection/correction circuits corresponding to the error detection/correction code generation circuits are built into the serial transfer module, and the error detection/correction system is used for the serial transfer.

8. A controller in which a plurality of modules that adopt the error detection/correction system according to claim 1 are connected via buses.

9. An error detection/correction system, comprising:
   a plurality of modules connected via buses to transmit data, each of the modules including,
   a plurality of error detection/correction code generation circuits and a plurality of error detection/correction circuits corresponding to a respective one of the error detection/correction code generation circuits, the plurality of error detection/correction code generation circuits generating an error correction code to be added to the data to be transmitted to one of the buses connected to one of the modules, wherein an error detection/correction code generation circuit and an error detection/correction circuit are switched over dependent upon a kind, a length, and a timing of the data to be transferred to detect and correct an error of the data having the error correction code added;
   wherein the error detection/correction system switches over error detection/correction codes to be used dependent upon a phase of transmitting an address, a command, and data.

* * * * *

UNITED STATES PATENT AND TRADEMARK OFFICE
CERTIFICATE OF CORRECTION

PATENT NO. : 7,428,686 B2
APPLICATION NO. : 10/726561
DATED : September 23, 2008
INVENTOR(S) : Kazunari Aoyama et al.

It is certified that error appears in the above-identified patent and that said Letters Patent is hereby corrected as shown below:

Title Page, Item (56) (Foreign Patent Documents), below
"JP    11-065944    3/1999" delete: "WO    98/01806    1/1998" (Repeated Entry).

Title Page, Column 2, below the listing of references beneath the heading: "FOREIGN PATENT DOCUMENTS", delete the heading "OTHER PUBLICATIONS" and, below that heading, delete: "Notice of Reasons for Rejection.".

Column 6, Line 57, after "upon" insert --on--.

Signed and Sealed this

Seventeenth Day of February, 2009

JOHN DOLL
*Acting Director of the United States Patent and Trademark Office*